(12) United States Patent
Belot et al.

(10) Patent No.: US 11,614,512 B2
(45) Date of Patent: Mar. 28, 2023

(54) RADIO TRANSCEIVER PRECISE TIME DELAY MEASUREMENT SYSTEM

(71) Applicant: Commissariat à l'Énergie Atomique et aux Énergies Alternatives, Paris (FR)

(72) Inventors: Didier Belot, Grenoble (FR); Frédéric Hameau, Grenoble (FR); Baudouin Martineau, Grenoble (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 171 days.

(21) Appl. No.: 16/864,468

(22) Filed: May 1, 2020

(65) Prior Publication Data

US 2020/0348395 A1 Nov. 5, 2020

(30) Foreign Application Priority Data

May 3, 2019 (FR) ...................................... 1904678

(51) Int. Cl.
*G01S 7/282* (2006.01)
*G01S 7/285* (2006.01)
*G01S 13/931* (2020.01)

(52) U.S. Cl.
CPC .............. *G01S 7/282* (2013.01); *G01S 7/285* (2013.01); *G01S 13/931* (2013.01)

(58) Field of Classification Search
CPC ........ G01S 7/282; G01S 7/285; G01S 13/825; G01S 7/352; G01S 13/14; G01S 7/4021; G01S 7/4052; G01S 7/4065; G01S 7/034; G01S 13/84; G01S 11/02; H04B 1/44; B60R 25/245; G07C 2209/63; G07C 9/00309; G07C 9/00944; G07C 2009/00555

See application file for complete search history.

(56) References Cited

U.S. PATENT DOCUMENTS

| 6,400,311 B1 | 6/2002 | Kolbli et al. |
| 2012/0050094 A1 | 3/2012 | Nakabayashi et al. |
| 2016/0240907 A1* | 8/2016 | Haroun ................. G01S 13/931 |

(Continued)

FOREIGN PATENT DOCUMENTS

| JP | H10-160837 A1 | 6/1998 |
| JP | H11-237466 A1 | 8/1999 |

(Continued)

OTHER PUBLICATIONS

Preliminary Search Report for French Application No. 1904678, dated Jan. 13, 2020.
FR1904678, Jan. 13, 2020, Preliminary Search Report.

*Primary Examiner* — Donald H B Braswell
(74) *Attorney, Agent, or Firm* — Wolf, Greenfield & Sacks, P.C.

(57) ABSTRACT

A radio wave transceiver system, including: at least one waveguide made of a dielectric material; a transceiver circuit coupled to a first end of each of said at least one waveguide, capable of transmitting and/or of receiving radio waves respectively propagating in said at least one waveguide; and at least one antenna coupled to a second end of said at least one waveguide, capable of transmitting and/or of receiving said waves to/from a non-guided external medium.

20 Claims, 3 Drawing Sheets

(56) References Cited

U.S. PATENT DOCUMENTS

2017/0324161 A1\* 11/2017 Kareisto ................ H01Q 3/267
2017/0356985 A1\* 12/2017 Yoshino ................ G01S 7/4817
2018/0210079 A1    7/2018 Hammerschmidt et al.

FOREIGN PATENT DOCUMENTS

JP            4802979    \* 10/2011   ............... H04B 1/40
WO    WO 2017/102157 A1    6/2017
WO    WO 2018/046353 A1    3/2018

\* cited by examiner

RADIO TRANSCEIVER PRECISE TIME DELAY MEASUREMENT SYSTEM

The present patent application claims the priority benefit of French patent application FR19/04678, which is herein incorporated by reference.

TECHNICAL BACKGROUND

The present disclosure generally relates to the field of systems of radio wave transmission and/or reception towards and/or from a non-guided external medium, for example, air or space. It particularly relates to radar systems embarked in motor vehicles.

PRIOR ART

In the automobile industry, and particularly with the development of autonomous vehicles, there is an increasing need to probe the environment around the vehicles. For this purpose, motor vehicles are now equipped with radar sensors. A same vehicle may typically comprise a plurality of radars, for example, one or a plurality of long-range radars, for example, having an approximate 150-meter range, for example using a 77-GHz carrier frequency with a FMCW-type modulation, and one or a plurality of short-range radars, for example, having an approximate 30-meter range, for example, using a band with a 4-GHz width centered around 79 GHz, for example, with a wideband harmonic or pulse modulation.

The information delivered by radar sensors is transmitted to a central processing unit, for example, an on-board computer, which processes it and accordingly makes decisions relative to the driving of the vehicle.

Conventionally, each radar sensor comprises its own analog-to-digital conversion circuit and transmits the detected information in the form of electronic digital words, via one or a plurality of metal conductors, for example, made of copper.

A disadvantage then lies in the relatively high cost and weight of the metal conductors coupling the radar sensors to the central processing unit. Further, the immunity to electromagnetic noise, generally higher in a motor vehicle, is then relatively low.

Another possibility is to provide, in each radar sensor, a circuit capable of converting the electronic digital signals supplied by the sensor into optical digital signals, and of transmitting these optical signals to the central processing unit via optical fibers. An inverse optical-to-electronic conversion is then performed at the level of the central processing unit.

Even though such an approach enables to limit the weight of connection cables and improves the immunity to electromagnetic noise, it has the disadvantage of being expensive due to the double electronic-to-optical-to-electronic transformation. Further, the accuracy required for the energy transfer between the optical modulator and the optical fiber (typically of a few micrometers) is difficult to reach given the usual vibrations of a vehicle, or implies using particularly expensive connectors.

SUMMARY

Thus, an embodiment provides a radio wave transceiver system, comprising:
at least one waveguide made of a dielectric material;
a transceiver circuit coupled to a first end of each of said at least one waveguide, capable of transmitting and/or of receiving radio waves propagating in said at least one waveguide; and
at least one antenna coupled to a second end of said at least one waveguide, capable of transmitting and/or of receiving said waves to/from a non-guided external medium.

According to an embodiment, said at least one waveguide comprises a core made of a first dielectric material, the core being in contact and/or covered and/or surrounded with a second dielectric material having a dielectric constant smaller than that of the first material.

According to an embodiment, said at least one waveguide comprises a sheath made of the second dielectric material, the core being in contact with the sheath all along its periphery over substantially the entire length of the guide.

According to an embodiment, except for the ends of said at least one waveguide, the core is not in contact with an electrically-conductive material.

According to an embodiment, the core has a solid cross-section.

According to an embodiment, the core has a cross-shaped cross-section.

According to an embodiment, the sheath is formed by a plastic element of a vehicle body.

According to an embodiment, the second end of said at least one waveguide is coupled to said at least one antenna via an amplifier.

According to an embodiment, the system is configured to be used as a radar to estimate distances by time-of-flight measurement between a forward radio wave transmitted by the transceiver circuit and a return radio wave received by the transceiver circuit after reflection on an external object.

According to an embodiment, the system comprises an initialization device capable of measuring a delay of the radio waves in said at least one waveguide.

According to an embodiment, the initialization device comprises a reflective metal shutter capable of being actuated to, during an initialization phase, be arranged in front of said at least one antenna.

According to an embodiment, said at least one antenna comprises a transmit antenna and a receive antenna, the initialization device comprising an initialization switch controllable to, during an initialization phase, bypass the transmit antenna and the receive antenna.

According to an embodiment, the initialization device further comprises, coupled to the second end of said at least one waveguide, a circuit for controlling the initialization switch, the control circuit being capable of detecting an initialization radio sequence transmitted by said at least one waveguide and of accordingly controlling the turning on of the initialization switch.

According to an embodiment, the transceiver circuit is a transceiver circuit of a package of a wireless communication network, said at least one waveguide and said at least one antenna being arranged to extend the range of the package.

According to an embodiment, the system is configured for the acquisition of radiographic images.

According to an embodiment, the radio waves have a carrier frequency in the range from 10 GHz to 1 THz and preferably from 30 GHz to 300 GHz.

Another embodiment provides a radio wave transceiver system, comprising:
at least one pair of waveguides made of a dielectric material comprising a transmit waveguide and a receive waveguide;

a transceiver circuit coupled to a first end of each of said transmit and receive waveguides, capable of transmitting and of receiving radio waves respectively propagating in said transmit and receive waveguides; and at least one transmit antenna and one receive antenna respectively coupled to a second end of said transmit and receive waveguides, and capable of transmitting or receiving said waves to/from a non-guided external medium, wherein the system further comprises an initialization device comprising an initialization switch controllable to, during an initialization phase, bypass the transmit antenna and the receive antenna to measure a round trip delay of the radio waves in said transmit and receive waveguides.

BRIEF DESCRIPTION OF THE DRAWINGS

The foregoing and other features and advantages will be discussed in detail in the following non-limiting description of specific embodiments in connection with the accompanying drawings, in which.

DESCRIPTION OF THE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the forming of the transceiver circuits and the forming of the antennas of the described systems have not been detailed, the described embodiments being compatible with usual transceiver circuits and antennas of radio wave transceiver systems, or the forming of such circuits and antennas being within the abilities of those skilled in the art based on the indications of the present disclosure.

Unless indicated otherwise, when reference is made to two elements electrically connected together, this signifies a direct electric connection without any intermediate elements other than conductors, and when reference is made to two elements coupled together, this signifies that these two elements can be connected or they can be coupled via one or more other elements.

Unless specified otherwise, the expressions "around", "approximately", "substantially" and "in the order of" signify within 10%, and preferably within 5%.

Figure 1:
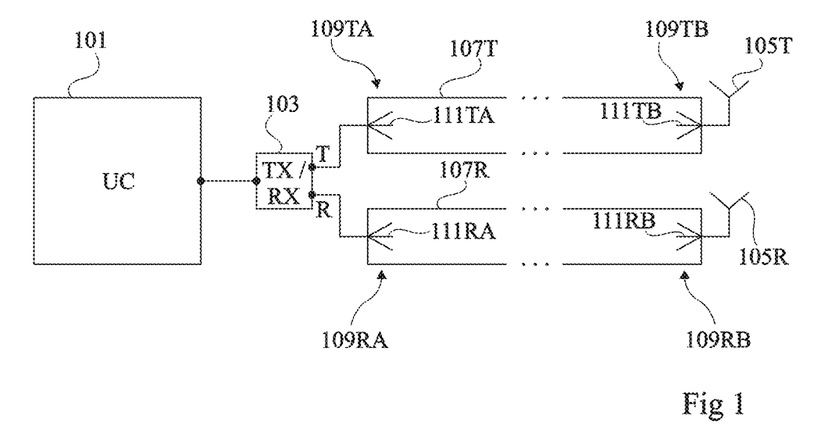
FIG. 1 schematically shows an example of a radio wave transceiver system according to an embodiment.

FIG. 1 schematically shows an example of a radar system according to an embodiment. The system of FIG. 1 is for example a radar system for a motor vehicle.

The system of FIG. 1 comprises a central processing unit 101 (UC), for example, arranged in a central region of the vehicle. The system of FIG. 1 further comprises one or a plurality of radio transceiver circuits 103 (TX/RX) electrically coupled, for example, electrically connected, to central processing unit 101. FIG. 1 shows a single transceiver circuit 103. Transceiver circuits 103 may be arranged in the vicinity of central processing unit 101, for example, at a distance shorter than 0.2 meter from central processing unit 101. Each transceiver circuit 103 is capable of transmitting and of receiving a radio wave in the form of an electronic signal propagating in an electric conductor, for example, metallic. Each circuit 103 may be controlled in transmit and/or in receive mode by central processing unit 101.

The system of FIG. 1 further comprises, for each circuit 103, a metallic transmit antenna 105T capable of transmitting towards the outside of the vehicle, that is, towards a non-guide external medium, the radio waves delivered by circuit 103, and a metallic receive antenna 105R capable of receiving from the outside of the vehicle, that is, from a non-guided external medium, radio waves sent to circuit 103. Antennas 105T, 105R may be distant from central processing unit 101 and from circuit 103. As an example, antennas 105T and 105R are located at a distance greater than 0.5 meter from the central processing unit and from circuit 103.

According to an aspect of the embodiment of FIG. 1, antennas 105T, 105R are coupled to circuit 103 via dielectric waveguides. More particularly, in the example of FIG. 1, a first dielectric waveguide 107T couples a transmit terminal T of circuit 103 to antenna 105T, and a second dielectric waveguide 107R couples a receive terminal R of circuit 103 to antenna 105. Each of waveguides 107T and 107R comprises a core (not detailed in FIG. 1) made of a first dielectric material, for example a plastic material, having a first dielectric constant $\varepsilon_{r2}$, for example, in the range from 1 to 4. Preferably, the core of each guide is in contact and/or covered and/or surrounded with a second dielectric material, for example, a plastic material, having a second dielectric constant $\varepsilon_1$ smaller than $\varepsilon_r 2$. Each of guides 107T and 107R for example comprises a sheath (not detailed in FIG. 1) made of the second dielectric material.

In operation, radio waves essentially propagate in the core of each guide, that is, the most part of the energy propagates inside of the first dielectric material. In practice, the higher the frequency of the signal will be, the larger the concentration in the core. As an example, in the case of a core having a solid circular cross-section, for a radio signal at 100 GHz, more than 60% of the energy propagates in the core. Such a concentration of the energy in the core is reinforced by the provision of a peripheral sheath made of a material of lower dielectric constant. Above 150 GHz, the concentration in the core may tend towards 100%. The peripheral sheath made of a material of lower dielectric constant enables to avoid for an external element, for example, metallic, to deviate part of the energy.

Except for the ends of the guide, the guide core is not in contact with an electrically-conductive material, particularly metallic.

Guide 107T has a first end coupled to the transmit terminal T of circuit 103 via a coupling device 109TA, and a second end coupled to antenna 105T via a coupling device 109TB. Guide 107R has a first end coupled to the receive terminal R of circuit 103 via a coupling device 109RA, and a second end coupled to antenna 105R via a coupling device 109RB.

Each of coupling devices 109TA, 109TB, 109RA, 109RB for example comprises, in the vicinity of the corresponding end of the corresponding guide 107T, 107R, a metal antenna 111TA, respectively 111TB, respectively 111RA, respectively 111RB, embedded in the dielectric material of the guide core and electrically connected, respectively, to terminal T of circuit 103, to antenna 105T, to terminal R of circuit 103, and to antenna 105R.

In operation, on order of central processing unit 101, transceiver circuit 103 delivers on its terminal T a radio signal, or forward signal, which is injected into guide 107T via coupling device 109TA. The forward radio signal then propagates to the opposite end of guide 107T, where it is extracted from the guide and transmitted to transmit antenna 105T by coupling device 109TB. The forward radio signal is then transmitted to the outside of the vehicle by antenna 105T.

When it encounters a reflective body, for example, an obstacle, the distance of which is desired to be determined, the radio signal transmitted by transmit antenna 105T is reflected towards receive antenna 105R. The reflected radio signal, or return signal, is received by antenna 105R, and then injected into guide 107R by coupling device 109RB. The return signal then propagates to the opposite end of guide 107R, where it is extracted from the guide and transmitted to the receive terminal R of circuit 103, by coupling device 109RA.

In this example, coupling device 109TA, 109TB, 109RA, 109RB are passive devices introducing no shape modification of the radio signal, except for possible parasitic deformations. In particular, coupling devices 109TA, 109TB, 109RA, and 109RB do not modify the carrier frequency or the modulation of the radio signals. In other words, the shape of the forward radio signal transmitted by antenna 105T to the outside of the vehicle is substantially the same as the shape of the radio signal supplied by circuit 103 on its transmit terminal T, and the shape of the radio signal received by circuit 103 on its receive terminal R is substantially the same as the shape of the return radio signal received by antenna 105R.

Circuit 103 and/or central processing unit 101 are configured to, based on the forward and return radio signals, determine the possible presence of an obstacle in front of the vehicle and, if present, estimate the distance between the vehicle and the obstacle.

In practice, central processing unit 101 may be coupled to a plurality of radars, each comprising a transceiver circuit 103, a transmit guide 107T, a transmit antenna 105T, a receive antenna 105R, a receive guide 107R, and associated coupling devices 109TA, 109TB, 109RA, 109RB.

An advantage of the embodiment of FIG. 1 lies in the relatively low weight of the dielectric waveguides ensuring the coupling between transceiver circuit 103 and the antennas 107T, 107R of each radar. Dielectric guides enable to transmit radio signals over relatively long distances, typically in the order of a plurality of meters in a motor vehicle, and have the advantage of being little sensitive to electromagnetic disturbances.

The system of FIG. 1 further has the advantage of generating no significant excess cost with respect to a conventional system where the radar sensors are coupled to the central processing unit by electrically-conductive cables. In particular, coupling devices 109TA, 109TB, 109RA, 109RB and guides 107T, 107R are relatively simple and inexpensive elements. Further, circuit 103 may be a conventional radar sensor transceiver circuit, for example, a commercial circuit usually intended to be directly connected to the transmit and receive antennas of a radar sensor.

Figure 2:
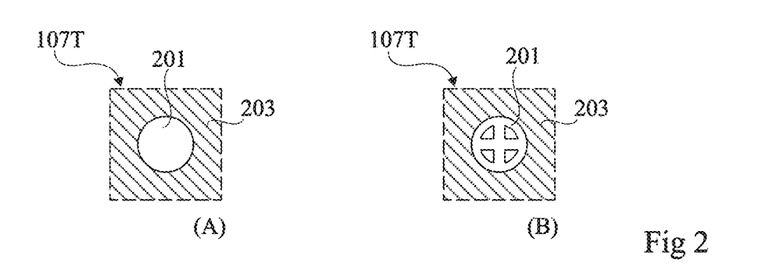
FIG. 2 schematically shows embodiments of a waveguide of the system of FIG. 1.

FIG. 2 schematically shows embodiments of the dielectric waveguide 107T of the system of FIG. 1. Although this is not shown in FIG. 2, guide 107R may be identical or similar to guide 107T. FIG. 2 more particularly comprises two cross-section views (A) and (B), corresponding to two embodiments of guide 107T.

In the example of view (A) of FIG. 2, the guide comprises a core 201 made of a dielectric material of dielectric constant $\varepsilon_{r2}$, having the shape of a solid wire of circular cross-section. As an example, core 201 may be a solid polytetrafluoroethylene (PTFE) wire, for example, having a diameter in the order of 2 mm. In this example, all along its periphery and over substantially its entire length, core 201 is totally surrounded and in contact with a sheath 203 made of a dielectric material having a dielectric constant $\varepsilon_{r1}$ smaller than $\varepsilon_{r2}$. As an example, sheath 203 may be made of a PTFE foam. As a variation, sheath 203 may be omitted, core 201 then being surrounded and in contact with air all along its periphery. The provision of a sheath 203 however has the advantage of guaranteeing the confinement of the radio signals within the guide even in case of a contact with an external element, for example, a metal element. Preferably, the core 201 of the guide is directly embedded in a plastic element of the vehicle body, which then forms the sheath of the guide.

The embodiment of view (B) differs from that of view (A) mainly by the shape of core 201, in cross-section. In the example of view (B), the wire 201 forming the guide core is an extruded wire having a cross-shaped cross-section. More particularly, in this example, in cross-section, wire 201 has the shape of a circular wheel with four spokes orthogonal two by two, defining a cross having its center coinciding with the center of the wheel. An advantage of such a structure is that it enables to concentrate the radio field towards the center of the cross.

Figure 3:
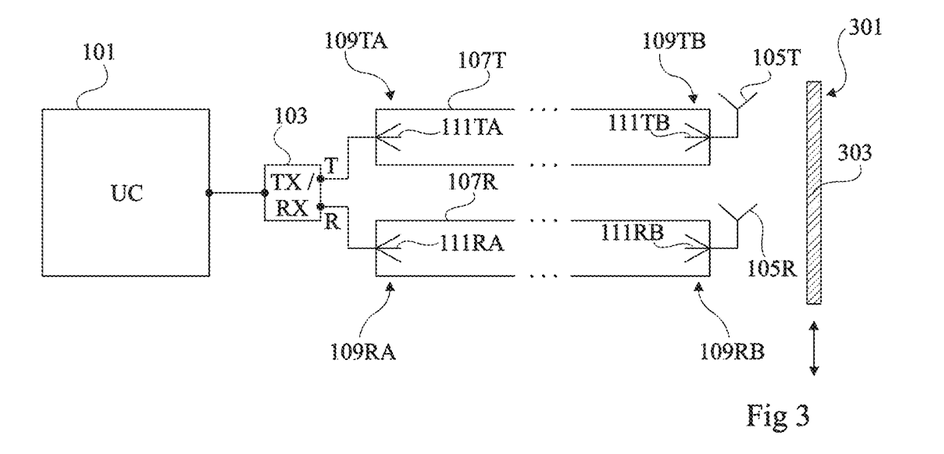
FIG. 3 schematically shows an alternative embodiment of the system of FIG. 1.

FIG. 3 schematically shows an alternative embodiment of the system of FIG. 1.

Conventionally, a radar sensor operates by time-of-flight measurement between a forward radio signal transmitted by the sensor, and a return signal reflected by an object to be detected and received by the sensor.

In the system of FIG. 1, the transceiver circuit 103 of the radar is distant from the transmit and receive antennas 105T and 105R of the radar. In the time-of-flight measurement performed by circuit 103 and/or by central processing unit 101, the propagation times of radio waves in dielectric waveguides 107T, 107R should thus be taken into account.

The system of FIG. 3 comprises an initialization or calibration device 301 comprising a reflective shutter 303, for example, a metal shutter, capable of being actuated by means of a motor, not detailed in the drawing. During an initialization phase, reflective shutter 303 is closed, that is, placed opposite antennas 105T, 105R of the radar, at a predefined distance from the antennas, for example, a distance in the range from 0.1 to 10 centimeters. Central processing unit 101 then controls circuit 103 to transmit a radio signal via its transmit terminal T. The return time of this signal to the receive terminal R of circuit 103 after reflection on metal shutter 303 is measured and forms a reference for subsequent distance measurements made by the radar. The metal shutter is then opened, that is, removed, to allow the detection of external objects by the radar. As an example, the initialization phase may be repeated each time the vehicle starts, which enables to take into account possible drifts of the time of propagation of radio signals within guides 107T, 107R, for example, due to the aging of the guides. During stop phases of the vehicle, reflective shutter 303 may be maintained in closed position and may then have as an additional function to protect antennas 105T, 105R.

Figure 4:
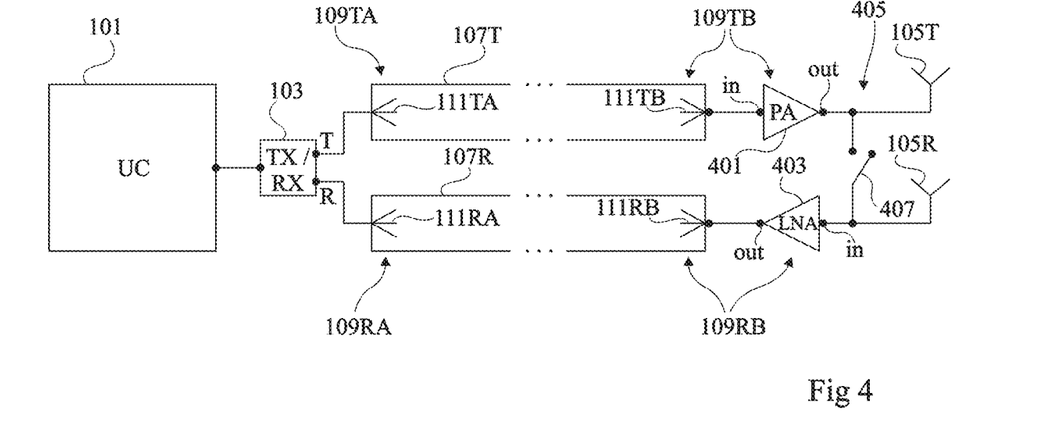
FIG. 4 schematically shows another alternative embodiment of the system of FIG. 1.

FIG. 4 schematically shows another alternative embodiment of the system of FIG. 1.

In the example of FIG. 1, coupling devices 109TA, 109TB, 109RA, 109RB are passive devices. In certain cases, it may however be desirable to provide active coupling devices capable of amplifying the transmitted or received radio signals.

The system of FIG. 4 differs from the system of FIG. 1 in that, in the example of FIG. 4, the output coupling device 109TB of waveguide 107T comprises a power amplifier 401 (PA) receiving, on an input terminal in, the output radio signal of waveguide 107T and delivering, on an output terminal out, an amplified image of the radio signal. The output terminal out of amplifier 401 is electrically coupled, for example, electrically connected, to the transmit antenna 105T of the radar. The input terminal in of amplifier 401 may be electrically coupled, for example, electrically connected, to antenna 111TB of coupling device 109TB.

The system of FIG. 4 further differs from the system of FIG. 1 in that, in the example of FIG. 4, the input coupling device 109TR of waveguide 107R comprises a low-noise amplifier 403 (LNA) receiving, on an input terminal in, the radio signal delivered by receive antenna 105R, and delivering, on an output terminal out, an amplified image of the radio signal. The input terminal in of amplifier 403 is electrically coupled, for example, electrically connected, to the receive antenna 105R of the radar. The output terminal out of amplifier 403 may be electrically coupled, for example, electrically connected, to antenna 111RB.

Amplifier 401 enables to compensate for the attenuation of the radio signal in guide 107TB, and amplifier 403 enables to increase the signal-to-noise ratio in receive mode. Amplifiers 401 and 403 introduce no modification of the shape of the radio signal. Thus, as in the example of FIG. 1, the shape of the forward radio signal transmitted by antenna 105T to the outside of the vehicle is substantially the same as the shape of the radio signal supplied by circuit 103 on its transmit terminal T, and the shape of the radio signal received by circuit 103 on its receive terminal R is substantially the same as the shape of the return radio signal received by antenna 105R.

In the example of FIG. 4, an initialization or calibration device 405 comprising a radio switch 407 having a first conduction terminal coupled, preferably connected, to an output terminal of coupling device 109TB, that is, in the present example, to the output terminal out of amplifier 401, and a second conduction terminal coupled, for example, connected, to an input terminal of coupling device 109RB, that is, in the present example, to the input terminal in of amplifier 403.

Radio switch here means a switch capable, in the off state, or blocking the direct transmission of radio signals from the output terminal out of amplifier 401 to the input terminal in of amplifier 403, thus forcing the passage of the radio waves through transmit and receive antennas 105T and 105R and, in the on state, of directly transmitting the radio signals from the output terminal out of amplifier 401 to the input terminal in of amplifier 403, thus bypassing antennas 105T and 105R. Switch 407 is for example a MEMS-type switch, or transistor switch, for example, such as described in patent application FR3048570, or also a switch comprising a phase-change material, for example, such as described in patent application EP3324455.

During an initialization phase, switch 407 is maintained on. Central processing unit 101 then control circuit 103 to transmit a radio signal via its transmit terminal T. The return time of this signal towards the receive terminal R of circuit 103 through switch 407 is measured and forms a reference for subsequent distance measurements performed by the radar. Switch 407 is then turned off to allow the detection of external objects by the radar. As an example, the initialization phase may be repeated at each starting of the vehicle.

It should be noted that the electronic initialization device 405 of the system of FIG. 4 may be replaced with a mechanical initialization device 301 described in relation with FIG. 3. Similarly, the mechanical initialization device 301 of the system of FIG. 3 may be replaced with the electronic initialization device 405 described in relation with FIG. 4.

Figure 5:
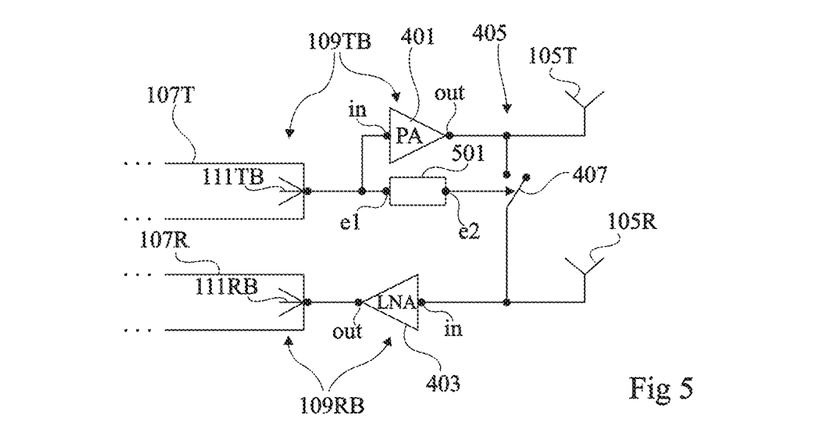
FIG. 5 schematically shows an alternative embodiment of the system of FIG. 4.

FIG. 5 schematically shows an alternative embodiment of the system of FIG. 4. For simplification, coupling devices 107TA, 109RA, transceiver circuit 103, and central processing unit 101 have not been shown in FIG. 5.

In the variant of FIG. 5, initialization device 405 further comprises a circuit 501 for controlling switch 407. Circuit 501 has an input terminal e1 coupled to the output antenna 111TB of waveguide 107T, for example, via a coupler (not detailed in the drawing), and an output terminal e2 coupled, for example, connected, to a control terminal of switch 407.

The system of FIG. 5 operates as follows. At the beginning of an initialization phase, central processing unit 101 controls transceiver circuit 103 to deliver, on its transmit terminal T, a predetermined specific sequence of radio signals, called initialization sequence. The initialization sequence is carried by the carrier frequency of the radar, for example, in the order of 80 GHz. The initialization sequence is transmitted by waveguide 107T to amplifier 401. At the output of waveguide 107T, part of the radio signal is shunted towards circuit 501, which detects the initialization sequence and accordingly controls the turning on of switch 407. The initialization signal then directly passes from output out of amplifier 401 to input in of amplifier 403, via switch 407, to then be looped back onto the receive terminal R of circuit 103 via waveguide 107R. The return time of the initialization signal is measured and forms a reference for the subsequent distance measurements performed by the radar. When a radio signal which does not correspond to an initialization sequence is transmitted by circuit 103, control circuit 501 maintains switch 407 off.

An advantage of the variant of FIG. 5 is that it enables to control the turning on of initialization switch 407 from central processing unit 101, via waveguide 107T, without requiring an electrically-conductive cable coupling central processing unit 101 to the control terminal of switch 407.

Figure 6:
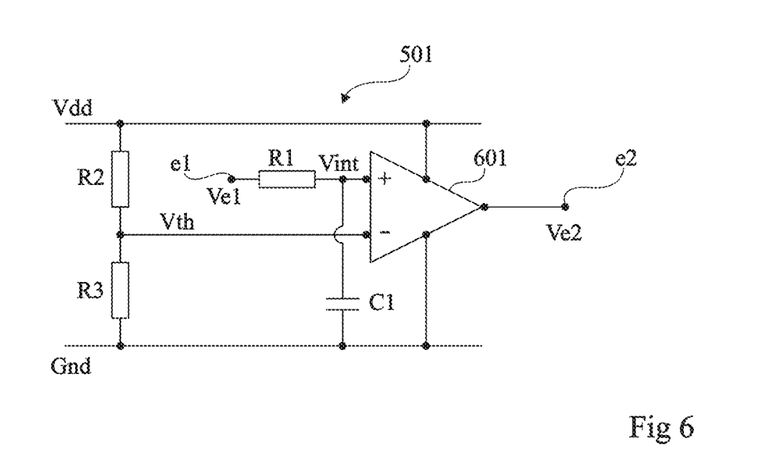
FIG. 6 schematically shows an embodiment of a circuit for controlling an initialization switch of the system of FIG. 5.

FIG. 6 is an electric diagram illustrating an embodiment of circuit 501 for controlling the initialization switch 407 of the system of FIG. 5.

In this example, circuit 501 comprises an operational amplifier 601, assembled as a threshold detector. More particularly, in the shown example, circuit 501 comprises a resistor R1 having a first end coupled, for example, connected, to the input terminal e1 of circuit 501, and a second end coupled, for example, connected, to the non-inverting input (+) of operational amplifier 601. Circuit 501 further comprises a voltage dividing bridge comprising a series association of a resistor R2 and of a resistor R3, between a node of application of a high power supply potential Vdd and a node of application of a low power supply potential Gnd (for example, the ground) of operational amplifier 601. The junction point of resistors R2 and R3 is coupled, for example, connected, to the inverting input (−) of operational amplifier 601. Circuit 501 further comprises a capacitor C1 having a first electrode coupled, for example, connected, to the non-inverting of operational amplifier 601, and a second electrode coupled, for example, connected, to the node of application of potential Gnd. The output of operational amplifier 601 is coupled, for example, connected to output terminal e2 of circuit 501.

The operation of the circuit 501 of FIG. 6 will now be described in relation with FIG. 7.

Figure 7:
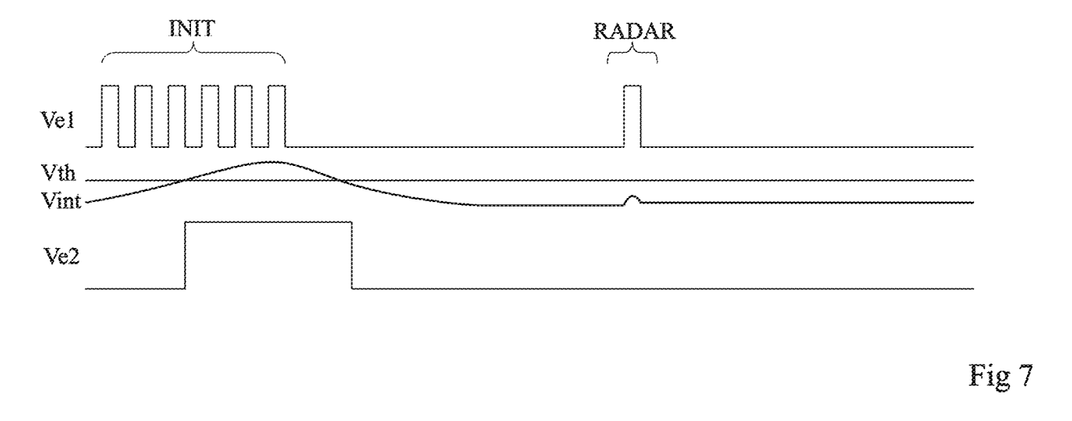
FIG. 7 is a timing diagram illustrating the operation of the control circuit of FIG. 6.

FIG. 7 is a timing diagram illustrating the time variation of the voltage Ve1 on the input terminal e1 of circuit 501, of the voltage Ve2 on the output terminal e2 of circuit 501, of the voltage Vth applied to the inverting input of operational amplifier 601, and of the voltage Vint applied to the non-inverting input of operational amplifier 601.

Initialization sequence INIT for example comprises a large number of close successive pulses, as illustrated in FIG. 7 (signal Ve1). Voltage Vint corresponds to the output signal of the integrator filter, applied to the non-inverting input of operational amplifier 601.

The voltage dividing bridge formed by resistors R2 and R3 generates a reference voltage Vth=Vdd*R3/(R2+R3), applied to the inverting input of operational amplifier 601.

When voltage Vint exceeds threshold Vth, the output voltage Ve2 of the operational amplifier switches to a high state, corresponding to a control state in the on state of switch 407. The next pulses of the initialization sequence are then directly looped back onto circuit 103, via switch 407.

When voltage Vint is smaller than threshold Vth, the output voltage Ve2 of the operational amplifier is in a low state, corresponding to a control state in the off state of switch 407. In particular, when a conventional radar pulse, for example, a single pulse designated with reference RADAR in FIG. 7, is sent by circuit 103, the integration of this pulse does not result in exceeding threshold Vth, so that switch 407 remains off.

It should be noted that the initialization sequence INIT of FIG. 7 may be directly generated by transceiver circuit 103 in the case of a pulse radar. In the case of a radar using a FMCW-type modulation, transceiver circuit 103 may be completed with an additional transceiver circuit (not detailed in the drawings) coupled to central processing unit 101 and coupled to waveguides 107T, 107R via coupling devices 107TA, 109RA, the additional transceiver circuit being specifically capable of transmitting or receiving initialization sequence INIT during initialization phases.

Embodiments of initialization or calibration devices enabling to measure the round trip delay of radio waves in dielectric waveguides 107T, 107R have been described in relation with FIGS. 3 to 7. During a distance measurement by means of the radar system, such a delay may be subtracted from the measured time of flight, to obtain an accurate estimate of the distance between the transceiver antennas and the detected object.

As a complement of the above-described calibration, an additional calibration of the transceiver circuit may be conventionally implemented to measure the round trip delay of the signal in the actual transceiver circuit. For this purpose, the terminals T and R of the transceiver circuit may be bypassed upstream of waveguides 107T, 107R, by means of an additional calibration switch, not shown, for example, integrated with transceiver circuit 103 in a same semiconductor chip. It should be noted that the propagation time or delay internal to the transceiver circuit is included in the propagation time measured during the previously-described calibration steps. It should be noted that the performing of such a propagation time measurement "internal" to the integrated circuit should better check the good internal operation of the integrated circuit rather than define a minimum propagation time.

It should be noted that the system according to the present invention advantageously enables to connect a plurality of assemblies of transceiver antennas, via different pairs of waveguides, to a same transceiver circuit. In this case, the transmit circuit may then comprise means for recording the round trip delay in the waveguides specific to each radar formed by each pair of waveguides and their associated transceiver antennas. Each propagation time or delay associated with a pair of transmit-receive waveguides will be determined during a calibration phase by bypassing the associated antennas. Thus, from a single calculation circuit internal to the transceiver circuit, it will be possible to accurately define the propagation times measured "from the antennas" located at distinct locations which may be more or less distant from the shared transceiver circuit.

Various embodiments and variants have been described. Those skilled in the art will understand that certain characteristics of these various embodiments and variants may be combined and other variants will occur to those skilled in the art. In particular, only embodiments of radar systems comprising a transmit antenna 105T distinct from receive antenna 105R and a transmit waveguide 107T distinct from receive waveguide 107R have been described hereabove. As a variation, antennas 105T and 105R may be confounded and form a single transceiver antenna, and/or waveguides 107T and 107R may be confounded and form a single transceiver waveguide.

Further, the described embodiments are not limited to the above-described example of application to a radar system, but may more generally apply to any system for transmitting and receiving radio waves, for example, waves having a carrier frequency in the range from 10 GHz to 1 THz, and preferably so-called millimeter waves, that is, waves having a carrier frequency in the range from 30 GHz to 300 GHz, particularly adapted to a transmission in dielectric waveguides.

As an example, the above-described embodiments may be adapted to extend the range of a wireless communication network, for example, a WiGig-type network using a carrier frequency in the order of 60 GHZ and a QAM-type modulation, which has the specificity of not propagating through walls. In this case, the central processing unit and the transceiver circuit may be included in a WiGig package placed in a first room of a building, and one or a plurality of dielectric waveguides may be provided to couple the WiGig package to distant antennas arranged in other rooms of the building.

More generally, this type of coupling between a direct central processing unit and air through a dielectric waveguide may be used in other types of environment and for other types of radio signals.

As an example, this type of link between a central processing unit and an external transceiver antenna may be used in radio signal imaging applications, for example, terahertz imaging applications.

The invention claimed is:

1. A radio wave transceiver system, comprising:
   at least one pair of waveguides made of a dielectric material comprising a transmit waveguide and a receive waveguide;

a transceiver circuit coupled to a first end of each of said transmit and receive waveguides, capable of transmitting and of receiving radio waves respectively propagating in said transmit and receive waveguides; and at least one transmit antenna and at least one receive antenna respectively coupled to a second end of said transmit and receive waveguides, wherein:

the radio wave transceiver system further comprises an initialization device comprising an initialization switch controllable to, during an initialization phase, bypass the transmit antenna and the receive antenna to measure a round trip delay of radio waves in said transmit and receive waveguides;

the second end of said transmit waveguide is coupled to said transmit antenna via a transmit amplifier and the second end of said receive waveguide is coupled to said receive antenna via a receive amplifier;

the radio wave transceiver system is configured to be used as a radar to estimate distances by time-of-flight measurement between a forward radio wave transmitted by the transceiver circuit and a return radio wave received by the transceiver circuit after reflection on an external object;

the radio wave transceiver system is configured to, during an estimation of the distance of an external object, subtract from the determined time of flight the round-trip delay measured during the initialization phase; and the initialization switch having a first conduction node coupled between the second end of the transmit waveguide and the at least one transmit antenna and a second conduction node coupled between the second end of the receive waveguide and the at least one receive antenna.

2. The radio wave transceiver system according to claim 1, wherein at least one waveguide of the transmit and receive waveguides comprises a core made of a first dielectric material, the core being surrounded with a second dielectric material having a dielectric constant smaller than that of the first material.

3. The radio wave transceiver system according to claim 2, wherein said at least one waveguide comprises a sheath made of the second dielectric material, the core being in contact with the sheath all along its periphery over the entire length of the guide.

4. The radio wave transceiver system according to claim 2, wherein, except for the first and second ends of said at least one waveguide, the core is not in contact with an electrically-conductive material.

5. The radio wave transceiver system according to claim 2, wherein the core has a solid cross-section.

6. The radio wave transceiver system according to claim 2, wherein the core has a cross-shaped cross-section.

7. The radio wave transceiver system according to claim 3, wherein the sheath is formed by a plastic element of a vehicle body.

8. The radio wave transceiver system according to claim 1, wherein the initialization device further comprises, coupled to the second end of at least one waveguide of the transmit and receive waveguides, a control circuit for controlling the initialization switch, the control circuit being capable of detecting an initialization radio sequence transmitted by said at least one waveguide and accordingly controlling turning on of the initialization switch.

9. The radio wave transceiver system according to claim 1, wherein said radio waves have a carrier frequency in the range from 10 GHz to 1 THz.

10. The radio wave transceiver system according to claim 1, wherein the initialization switch is controllable to, during the initialization phase, connect an input node of the at least one transmit antenna to an output node of the at least one receive antenna.

11. The radio wave transceiver system according to claim 1, wherein the at least one transmit antenna and the at least one receive antenna are located at a distance greater than 0.5 meters from the transceiver circuit.

12. A radio-frequency (RF) transceiver system, comprising:

a first dielectric waveguide comprising a first end and a second end;

a second dielectric waveguide comprising a first end and a second end;

at least one RF transmit antenna coupled to the second end of the first dielectric waveguide;

at least one RF receive antenna coupled to the second end of the second dielectric waveguide;

an RF transceiver circuit coupled to the first ends of the first and second dielectric waveguides and configured to transmit RF signals via the first dielectric waveguide and the at least one RF transmit antenna and receive RF signals via the second dielectric waveguide and the at least one RF receive antenna;

a switch having a first terminal coupled to the second end of the first dielectric waveguide and a second terminal coupled to the second end of the second dielectric waveguide, the switch operable to control a path of RF signals from the second end of the first dielectric waveguide to the second end of the second dielectric waveguide to bypass the at least one RF transmit antenna;

a first amplifier coupling the second end of the first dielectric waveguide to the switch; and a second amplifier coupling the second end of the second dielectric waveguide to the switch.

13. The RF transceiver system according to claim 12, wherein the switch is operable to conduct the RF signals from the second end of the first dielectric waveguide to the second end of the second dielectric waveguide to bypass the at least one RF transmit antenna and the at least one RF receive antenna.

14. The RF transceiver system according to claim 12, wherein each of the first and second dielectric waveguides comprises:

a core including a first dielectric material; and a second dielectric material at least partially surrounding the core, the second dielectric material having a dielectric constant smaller than a dielectric constant of the first material.

15. The RF transceiver system according to claim 12, further comprising a circuit coupled to the second end of the first dielectric waveguide and configured to control the switch to bypass the at least one transmit antenna in response to detecting an RF sequence at the second end of the first dielectric waveguide.

16. The RF transceiver system according to claim 12, wherein the RF transceiver system is configured to operate with a carrier frequency between 10 GHz and 1 THz.

17. The RF transceiver system according to claim 12, wherein:

the at least one transmit antenna comprises an input terminal configured to receive RF signals from the second end of the first dielectric waveguide to be transmitted;

the at least one receive antenna comprises an output terminal configured to provide received RF signals to the second end of the second dielectric waveguide; and the switch is operable to conduct RF signals from the input terminal of the at least one transmit antenna to the output terminal of the at least one receive antenna.

18. The RF transceiver system according to claim 12, further configured for radar operation to estimate a distance to an object by time-of-flight measurement using a first RF signal transmitted by the RF transceiver circuit and a second RF signal received by the RF transceiver circuit in response to the first RF signal reflecting off of the object.

19. The RF transceiver system according to claim 18, further configured to, during an estimation of the distance to the object, subtract from the time-of-flight measurement a round-trip delay measured prior to transmitting the first RF signal, the round-trip delay measured by using the switch to control the path of RF signals from the second end of the first dielectric waveguide to the second end of the second dielectric waveguide to bypass the at least one RF transmit antenna.

20. The RF transceiver system according to claim 12, wherein the at least one RF transmit antenna and the at least one RF receive antenna are located at least 0.5 meters away from the RF transceiver circuit.

* * * * *